2 Sheets—Sheet 1.

F. A. HUBEL.

MACHINE FOR CUTTING OFF GELATINE CAPSULES.

No. 10,807. Reissued Feb. 8, 1887.

WITNESSES:
Henry E. Everding.
Charles F. Wraber

INVENTOR
Frederick A. Hubel
BY
J. H. Lindenbtyde
ATTORNEY

F. A. HUBEL.
MACHINE FOR CUTTING OFF GELATINE CAPSULES.
No. 10,807. Reissued Feb. 8, 1887.
Fig. 3.
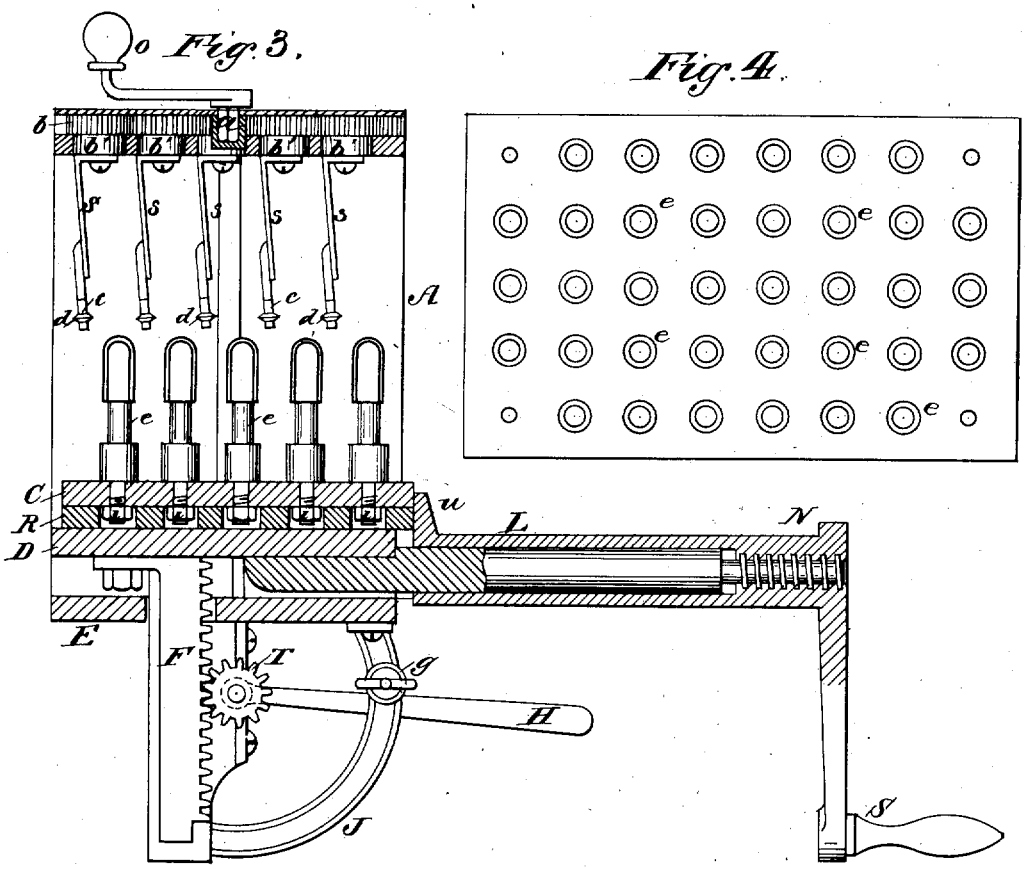
Fig. 4.
Fig. 5.
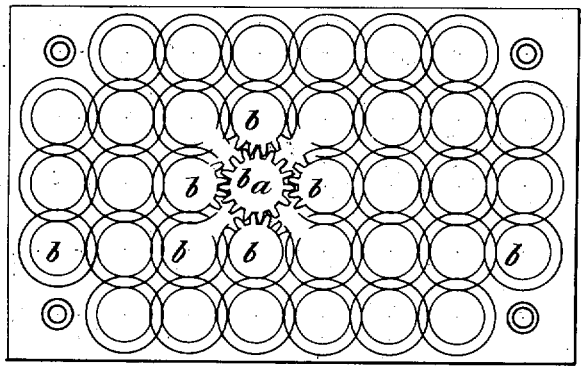
Fig 6.
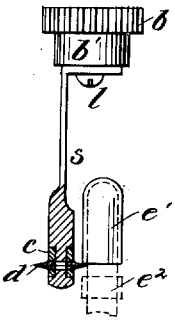
WITNESSES:
Henry E. Everding
Charles G. F. Wahey
INVENTOR
Frederick A. Hubel
BY
J. E. Hindmarsh Hyde
ATTORNEY

UNITED STATES PATENT OFFICE.

FREDERICK A. HUBEL, OF DETROIT, MICHIGAN.

MACHINE FOR CUTTING OFF GELATINE CAPSULES.

SPECIFICATION forming part of Reissued Letters Patent No. 10,807, dated February 8, 1887.

Original No 187,279, dated February 13, 1877. Reissue No. 8,440, dated October 1, 1878. Reissue No. 10,437, dated January 15, 1884.
Application for reissue filed November 19, 1886. Serial No. 219,414.

*To all whom it may concern:*

Be it known that I, FREDERICK A. HUBEL, of Detroit, in the county of Wayne and State of Michigan, have invented an Improvement in Machines for Cutting off Gelatine Capsules, of which the following is a specification.

The nature of my invention is that of a new and useful machine for cutting off at a required and uniform length empty gelatine capsules preparatory to their being removed from the molds upon which they are formed; and I do hereby declare that the following is a full description thereof, reference being had to the accompanying drawings and the letters of reference marked thereon, making part of this specification.

The particulars of my invention are specified in the claims.

Figure 1:
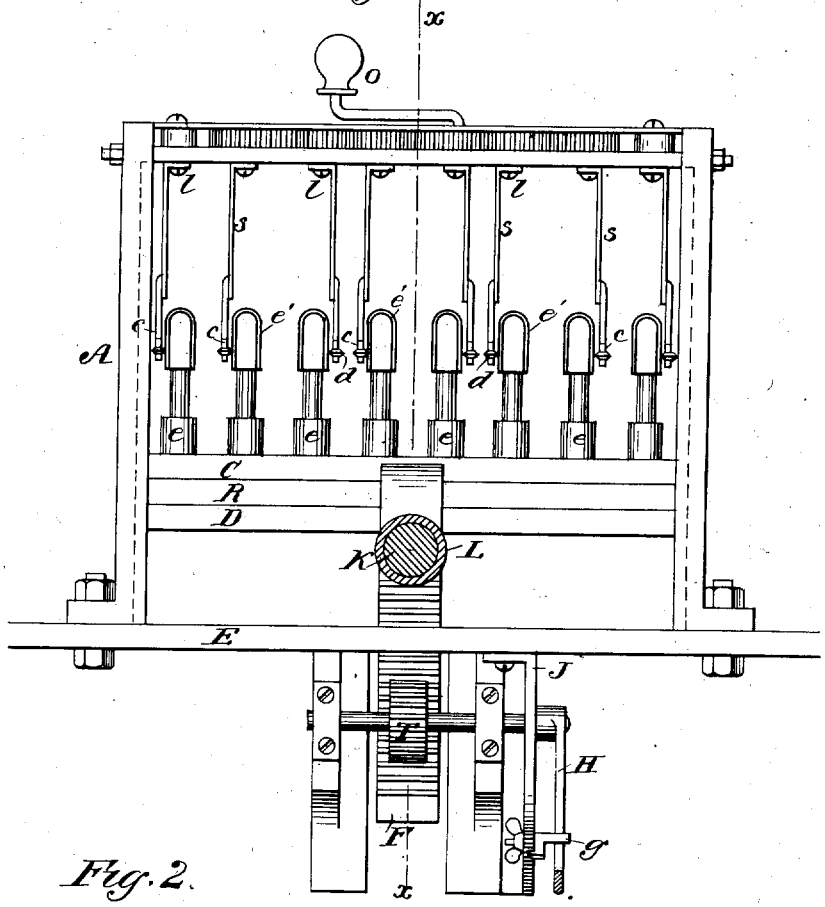
Figure 2:
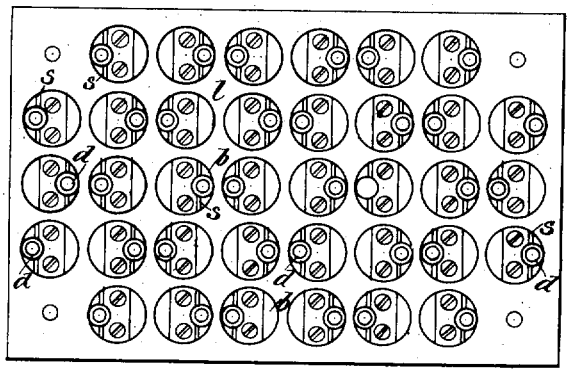

Figure 1 is a front elevation of my improved machine. Fig. 2 is a plan view of the upper plate, showing the knives in their position after the crank O, Fig. 1, has been turned half around. Fig. 3 is a vertical cross-section on the line *x x*, Fig. 1. Fig. 4 is a plan view of the set of molds. Fig. 5 is a plan view of the upper plate of the machine, showing the cog-wheels in their position. Fig. 6 is an enlarged view of one of the cutters and molds, showing the capsule cut off and prepared for removal from the mold.

Like letters refer to like parts in each figure.

In the accompanying drawings, which form a part of this specification, A represents a suitable frame resting upon the base E, to support the operating parts of my machine.

D is a platform supported upon the upper end of the rack-bar F, and has a vertical motion by means of the pinion T engaging with the said rack-bar and operated by the lever H. By means of the segment J and set-screw *g* this platform is secured at any desired elevation. To this platform, so that it will have a vertical motion with it, is secured the arm K, carrying the hollow arm L, and the screw N, operated by the crank S, so arranged that the mold-carrying plate R C may be either unlocked, and therefore withdrawn at pleasure, or may be advanced to and secured in any position.

The capsule-molds *e e* are made of metal, and are secured in a vertical position and at regular intervals to the top of the plate C by nuts *i*, let into proper recesses in the plate R, so as to give the mold-plate a smooth base.

The arm L is provided with a projection, *u*, so arranged that it may be turned down to allow the mold-plate R C to be inserted, and then turned up and pressed against the edges of said plate, locking the same in position.

In the top of the frame there is journaled a series of small drums, *b'*. To each of these drums is secured a pinion, *b*, arranged to engage with each other, as shown in Fig. 5. Those in the center engage with a pinion, *a*, which receives motion from the crank O, and communicates such motion, by the engaging pinions, to the drums *b'*. The latter should correspond in number to the number of molds employed on the mold-plate, and must be placed with like regular intervals between them. To the lower side of each of these drums there is secured, by the screws *l*, a downwardly-projecting spring-arm, *s*, carrying at its free end a knife, *d*, secured to the head *c*. When the machine is in use, the arm, as shown in Fig. 3, will operate the cutter in the position shown in Fig. 6.

In practice, the molds *e*, secured, as described, substantially to the plates R C, are withdrawn from the frame after turning down the projection *u*, thereby unlocking them, and they are then immersed to the proper depth in the gelatine prepared for the purpose. After the molds have received a coating of gelatine of sufficient thickness to make the capsules, the mold-plates are placed on the platform D in such a position that each of the molds is presented to the spaces between the cutters. Then these molds are raised to the required height within the spaces between the knives, such height bringing the knives opposite the point where the capsules are to be cut off. Then the crank S is rotated, forcing the projection *u* (which has previously been turned up) against the mold-plate, pressing the molds against the knives, as shown in Figs. 1 and 6. Then the crank O is rotated, which, by the devices hereinbefore described, causes the knives to perform their office, as shown in the latter figure. After the cut has been made, the molds are again raised farther up by the lever H, and the part of the capsule or coating $e^2$, Fig. 6, is shoved away from the upper part, *e'*, Fig. 6.

By the means described it will be seen that I am able to produce capsules of uniform length, as may be required, without changing any of the parts of my machine.

I do not claim the molds by which the capsules are made, and upon which they are placed during the operation of cutting them off, as described, as part of my invention; nor do I claim as part of my invention the composition of gelatine in which the molds are dipped to form the capsules.

I do not claim, broadly, any mold-plate having a series of capsule-molds, as dishes so arranged and plates with a handle at the back have been previously described as used simply for molding certain forms of capsules; but I only claim a mold-plate having the molds secured thereto at regular intervals, when the same is used in combination with the frame of an organized capsule-cutting machine, so as to be held therein and removable therefrom; but What I do claim as my invention, and desire to secure by Letters Patent, is—

1. In a machine for cutting off capsules, the combination of the series of molds *e* and the rack, pinion, and lever F T H, or their equivalents, substantially as and for the purposes described.

2. In a machine for cutting off capsules, the combination of the mold-plate, adapted to and holding a series of molds, and the screw mechanism L K N, substantially as and for the purposes described.

3. In a capsule-cutting machine, a series of knives operated by a crank and pinion acting upon a series of pinions, one of which operates each of said knives, substantially as described.

4. In a capsule-cutting machine, the knives operated by gearing, substantially as described, and supported upon spring-arms, substantially as and for the purposes set forth.

5. In a capsule-cutting machine, the combination of the mold-plates provided with molds, rack, pinion, and lever F T H, and the screw mechanism L K N, substantially as and for the purposes described.

6. The removable mold-plate bearing a series of capsule-molds secured thereto at regular intervals, combined with and arranged to be held by and withdrawn from the supporting-frame, and when used as and for the purposes set forth.

F. A. HUBEL.

Witnesses:
GEO. H. LOTHROP,
C. M. MASON.